US011629028B2

(12) United States Patent
Yoshizaki et al.

(10) Patent No.: US 11,629,028 B2
(45) Date of Patent: Apr. 18, 2023

(54) PROTECTIVE SHEET AUTOMATIC PEELING APPARATUS AND PROTECTIVE SHEET AUTOMATIC PEELING METHOD

(71) Applicant: NIPPI Corporation, Yokohama (JP)

(72) Inventors: Risa Yoshizaki, Yokohama (JP); Takehito Takatsu, Yokohama (JP); Toru Jinishi, Yokohama (JP)

(73) Assignee: NIPPI Corporation, Yokohama (JP)

(*) Notice: Subject to any disclaimer, the term of this patent is extended or adjusted under 35 U.S.C. 154(b) by 0 days.

(21) Appl. No.: 17/647,343

(22) Filed: Jan. 6, 2022

(65) Prior Publication Data

US 2022/0127102 A1 Apr. 28, 2022

Related U.S. Application Data

(62) Division of application No. 16/978,614, filed as application No. PCT/JP2018/044259 on Nov. 30, 2018, now Pat. No. 11,247,866.

(30) Foreign Application Priority Data

Mar. 5, 2018 (JP) ............................ JP2018-039128

(51) Int. Cl.
*B32B 43/00* (2006.01)
*B65H 41/00* (2006.01)
*B32B 38/10* (2006.01)

(52) U.S. Cl.
CPC ........... *B65H 41/00* (2013.01); *B32B 43/006* (2013.01); *B32B 38/10* (2013.01); *Y10T 156/1137* (2015.01); *Y10T 156/1939* (2015.01)

(58) Field of Classification Search
CPC ............. B32B 43/006; Y10T 156/1137; Y10T 156/1939
See application file for complete search history.

(56) References Cited

U.S. PATENT DOCUMENTS 4,961,817 A 10/1990 Seki
5,000,814 A 3/1991 Sumi
(Continued)

FOREIGN PATENT DOCUMENTS

DE 102008018726 A1 * 10/2009 ............... B26D 3/28
JP H08181489 A 7/1996
(Continued)

OTHER PUBLICATIONS

Translation of specification DE 10 2008/018726 A1 (Year: 2009).*
International Search Report dated Jan. 29, 2019 in International Application No. PCT/JP2018/044259, total 2 pages.

*Primary Examiner* — Philip C Tucker
*Assistant Examiner* — Nickolas R Harm
(74) *Attorney, Agent, or Firm* — Masuvalley & Partners; Peter Martinez

(57) ABSTRACT

Provided is an automatable peeling apparatus for peeling a protective sheet from a prepreg sheet. This peeling apparatus 2 is equipped with a loading unit 11, a prepreg sheet conveying unit 12, a leading end position detection unit 13, air spraying units 14, 15, a peeling state detection unit 16, protective sheet gripping/conveying units 17, 18, an extraction unit 19, and a control unit 20. The control apparatus 20 controls the loading unit 11, the prepreg sheet conveying unit 12, the leading end position detection unit 13, the air spraying units 14, 15, the peeling state detection unit 16, the protective sheet gripping/conveying units 17, 18, and the extraction unit 19. The first spraying mechanism 14 sprays first air onto the front of the end face of the prepreg sheet. The second spraying mechanism 15 sprays second air and fourth air onto the peeling boundary of the protective sheet.

1 Claim, 10 Drawing Sheets

(56) References Cited

U.S. PATENT DOCUMENTS

| | | | |
|---|---|---|---|
| 5,358,591 | A | 10/1994 | Candore |
| 5,540,809 | A | 7/1996 | Ida |
| 6,500,298 | B1 | 12/2002 | Wright |
| 8,137,503 | B2 | 3/2012 | Hiranaka |
| 9,975,321 | B2 | 5/2018 | Ayabe |
| 2008/0289763 | A1 | 11/2008 | Su |
| 2018/0295727 | A1 | 10/2018 | Chang |

FOREIGN PATENT DOCUMENTS

| | | | |
|---|---|---|---|
| JP | 2000203759 | A | 7/2000 |
| JP | 2001328039 | A | 11/2001 |
| JP | 2005041611 | A | 2/2005 |
| JP | 2005298140 | A | 10/2005 |
| JP | 2008037572 | A | 2/2008 |
| JP | 2008285325 | A | 11/2008 |
| JP | 2013086941 | A | 5/2013 |
| JP | 2014125285 | A | 7/2014 |

* cited by examiner

TEMPORALITY POSED

FIRST AIR

SECOND AIR

THIRD AIR

FOURTH AIR

CONVEYING PREPREG SHEET S10

STOPPING AT LEADING END POSITION S20

SPRAYING FIRST AIR S30

SPRAYING SECOND AIR S40

SPRAYING THIRD AIR S50

GRIPPING PROTECTIVE SHEET S60

CONVEYING PREPREG SHEET S70

SPRAYING FOURTH AIR S80

CONVEYING PROTECTIVE SHEET S90

EXTRACTING PREPREG SHEET S100

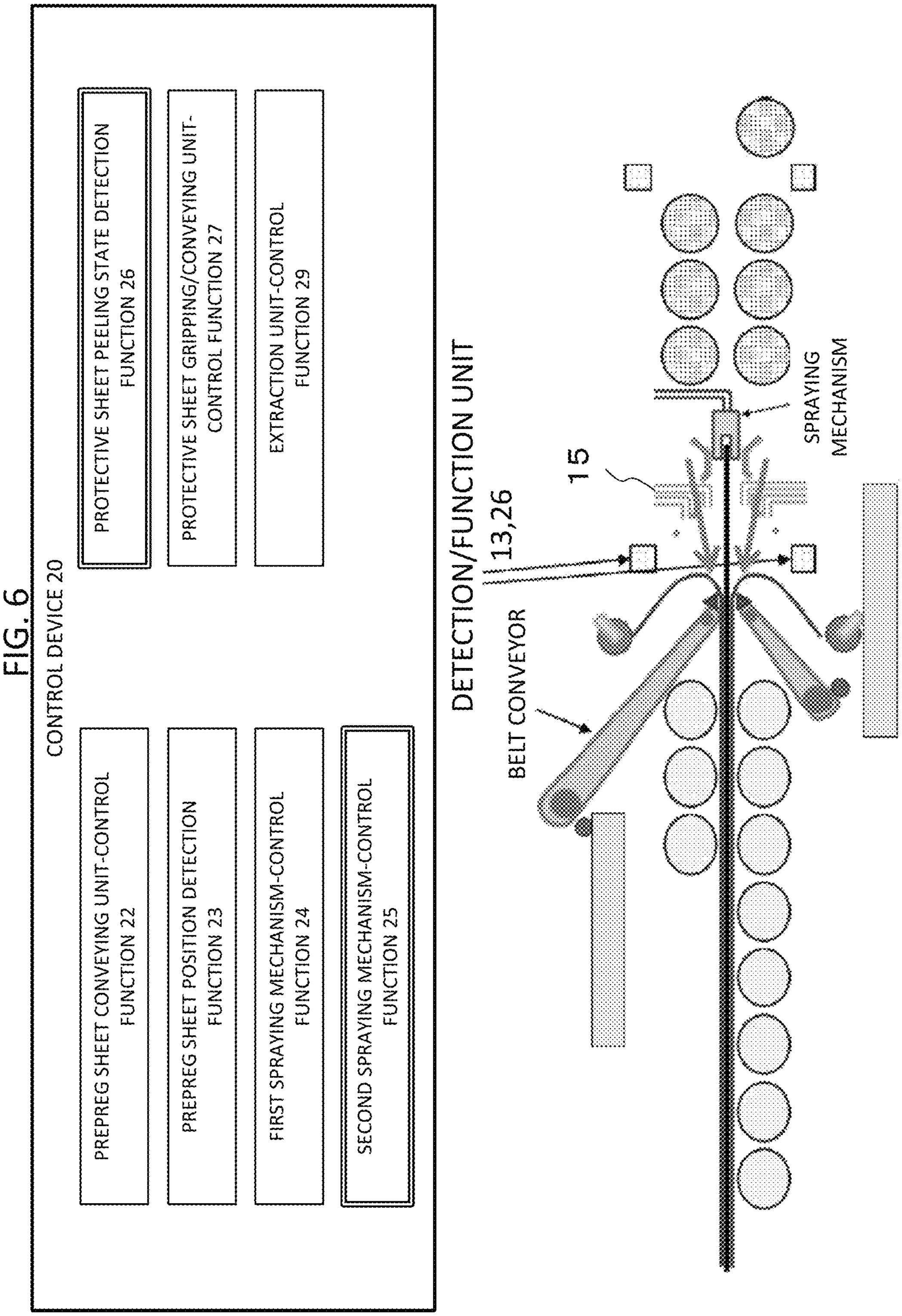

FIG. 6
CONTROL DEVICE 20
PREPREG SHEET CONVEYING UNIT-CONTROL FUNCTION 22
PREPREG SHEET POSITION DETECTION FUNCTION 23
FIRST SPRAYING MECHANISM-CONTROL FUNCTION 24
SECOND SPRAYING MECHANISM-CONTROL FUNCTION 25
PROTECTIVE SHEET PEELING STATE DETECTION FUNCTION 26
PROTECTIVE SHEET GRIPPING/CONVEYING UNIT-CONTROL FUNCTION 27
EXTRACTION UNIT-CONTROL FUNCTION 29
DETECTION/FUNCTION UNIT
13,26
15
BELT CONVEYOR
SPRAYING MECHANISM

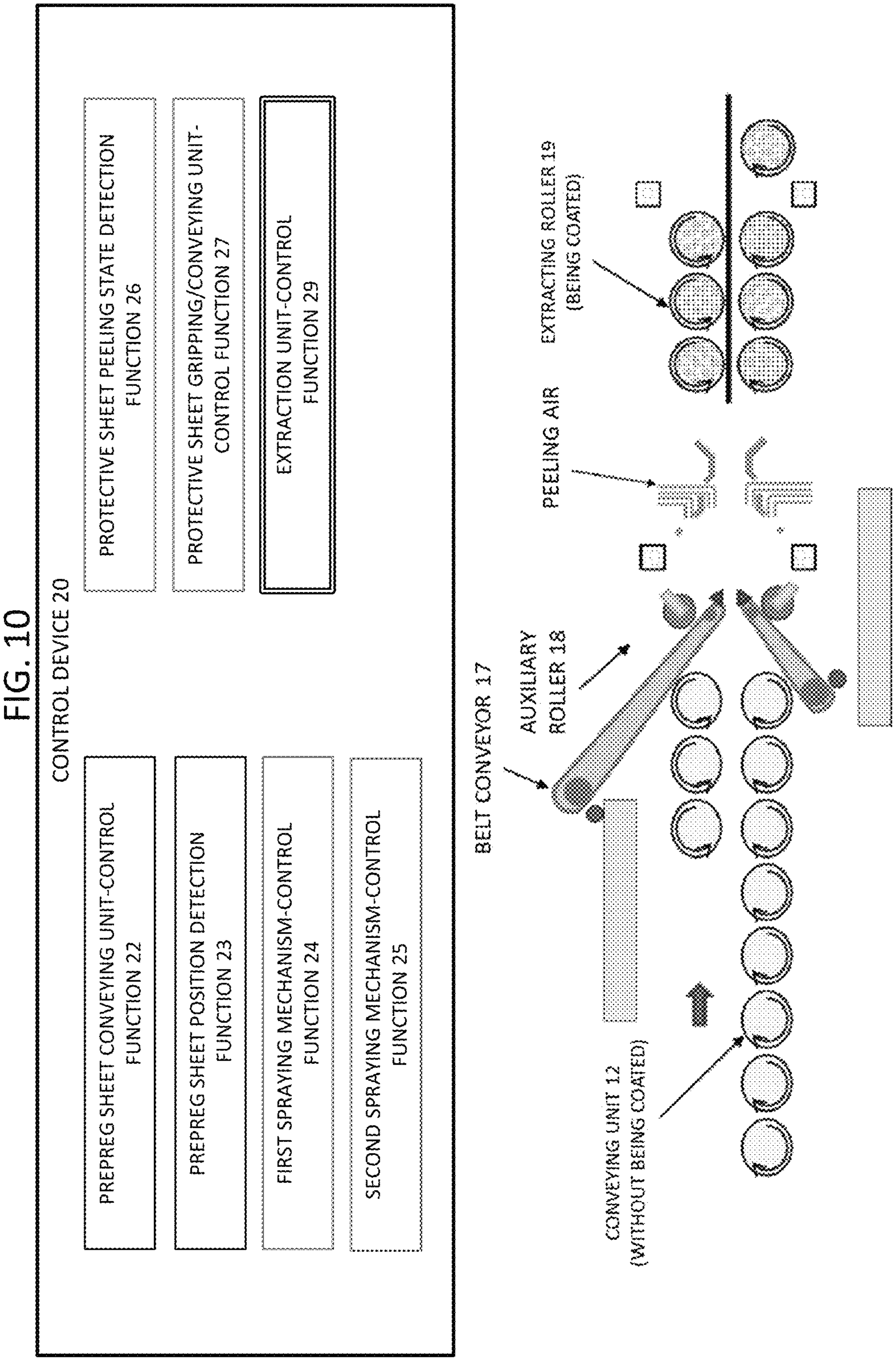

FIG. 10
CONTROL DEVICE 20
PREPREG SHEET CONVEYING UNIT-CONTROL FUNCTION 22
PREPREG SHEET POSITION DETECTION FUNCTION 23
FIRST SPRAYING MECHANISM-CONTROL FUNCTION 24
SECOND SPRAYING MECHANISM-CONTROL FUNCTION 25
PROTECTIVE SHEET PEELING STATE DETECTION FUNCTION 26
PROTECTIVE SHEET GRIPPING/CONVEYING UNIT-CONTROL FUNCTION 27
EXTRACTION UNIT-CONTROL FUNCTION 29
BELT CONVEYOR 17
AUXILIARY ROLLER 18
PEELING AIR
EXTRACTING ROLLER 19 (BEING COATED)
CONVEYING UNIT 12 (WITHOUT BEING COATED)

MODIFICATION EXAMPLE

PROTECTIVE SHEET AUTOMATIC PEELING APPARATUS AND PROTECTIVE SHEET AUTOMATIC PEELING METHOD

RELATED APPLICATIONS

This application is a Divisional of and claims priority to U.S. patent application Ser. No. 16/978,614, filed Sep. 4, 2020, which is a U.S. National Phase application under 35 U.S.C. § 371 of International Patent Application No. PCT/JP2018/044259, International Filing Date Nov. 30, 2018, which claims the benefit of Japanese Patent Application No. 2018-039128 filed Mar. 5, 2018; all of which are incorporated herein by reference in their entireties.

TECHNICAL FIELD

The present invention relates to a technique for forming fiber reinforced plastic (FRP). More specifically, the present invention relates to a peeling apparatus for peeling protective sheets off from a prepreg sheet.

BACKGROUND ART

The prepreg is a reinforcing material, e.g., a carbon fiber, impregnated with an uncured thermosetting resin. The prepreg is formed into a sheet shape. The uncured prepreg has a difficulty in treating thereof because of its viscosity. Therefore, the prepreg sheet is protected by protective sheets on its both surfaces.

By the way, Patent Literature 1 proposes FRP forming system including a lamination apparatus that automatically laminates prepreg sheets to form a laminated body.

In Patent Literature 1, a peeling apparatus is disposed on the upstream side of the lamination apparatus, and the prepreg sheets are supplied to the lamination apparatus after protective sheets are peeled off by the peeling apparatus.

CITATION LIST

Patent Literature

[PATENT LITERATURE 1] JP 2014-125285A

SUMMARY OF INVENTION

Technical Problem

Patent Literature 1 discloses a detailed structure of the lamination apparatus, but it does not disclose a specific structure of the peeling apparatus. Even where only the lamination apparatus is automated, if the peeling apparatus is not automated to a satisfactory level, the entire system will not function satisfyingly.

In a case where the peeling apparatus is not automated to a satisfactory level, it is required that an operator should manually peel off protective sheets. There are technical problems with the manually performed protective sheet peeling operation in an increase of manufacturing cost caused by the manual operation, a quality variation depending on operators (for example, occurrence of wrinkles and distortions on the prepreg sheet), an increase of working hours caused because the peeling work and the subsequent conveying work to the lamination apparatus are independently performed, and the like.

The invention of the present application was made to solve the above described technical problems. The purpose of the present invention is to provide an automatable peeling apparatus.

Solution to Problem

A peeling apparatus of the present invention for solving the above described technical problems peels off protective sheets attached to a prepreg sheet. The peeling apparatus includes a loading unit for receiving the prepreg sheet with protective sheets attached thereto, a prepreg sheet conveying unit for delivering the prepreg sheet in a feeding direction, a leading end position detection unit for detecting whether a leading end position of the prepreg sheet arrives at a predetermined position, an air spraying unit for spraying air onto the prepreg sheet or/and the protective sheets, a protective sheet gripping/conveying unit for gripping the protective sheets peeled off by the air from the air spraying unit and delivering the protective sheets in a direction opposite to the feeding direction, an extraction unit for extracting the prepreg sheet delivered in the feeding direction after the protective sheets are peeled off, and a control unit for controlling each of the above mentioned units.

With the above described structures, automatization of the peeling apparatus can be realized.

In the above described invention, preferably, the control unit executes processing for causing the prepreg sheet conveying unit to deliver the prepreg sheet with the protective sheets attached thereto in the loading unit, processing for causing the leading end position detection unit to detect whether a prepreg sheet leading end position arrives at a peeling start position and, upon detection thereof, causing the prepreg sheet conveying unit to stop its delivery, processing for causing the air spraying unit to spray the first air from the front along the prepreg sheet end face, processing for causing the air spraying unit to spray the second air onto peeling boundaries of the protective sheets, processing for causing the air spraying unit to spray the third air onto the protective sheets peeled off by the second air, processing for causing the protective sheet gripping/conveying unit to grip the protective sheets oriented by the third air, processing for, while causing the prepreg sheet conveying unit to deliver the prepreg sheet and further causing the protective sheet gripping/conveying unit to deliver the protective sheets in a direction opposite to the feeding direction, causing the air spraying unit to spray the fourth air onto the peeling boundaries of the protective sheets, and processing for causing the extraction unit to extract the prepreg sheet delivered in the feeding direction after the protective sheets are peeled therefrom.

The above described controls can realize automatization of the peeling apparatus.

In the above described invention, preferably, the air spraying unit includes a first spraying mechanism for spraying the first air and a second spraying mechanism for spraying the second air to the fourth air, wherein the first spraying mechanism is provided in front of a prepreg sheet end face at the peeling start position in a freely installable/removable manner, and wherein the second spraying mechanism freely changes the spraying direction between a direction onto the prepreg sheet and a direction away from the prepreg sheet.

Spraying of the first air by the first spraying mechanism serves to start peeling of the protective sheets. Spraying of the second air and the fourth air by the second spraying mechanism serves to continue the peeling of the protective sheets. Spraying of the third air by the second spraying mechanism serves to orient the peeled protective sheets.

In the above described invention, the first spraying mechanism includes a spray nozzle and a spray guide provided on the spray nozzle, wherein the spray guide is installed in such a manner that a prepreg sheet end edge at a peeling start position is sandwiched from the both sides.

Because the spray guide sandwiches the prepreg sheet end edge from the both sides, fluttering of the prepreg sheet end edge caused by the spraying of the first air can be suppressed.

In the above described invention, the spray guide is movable along the prepreg sheet end face, and holding widths expand at both edge sides compared with center parts.

With such a structure that the first spraying mechanism is movable along the prepreg sheet end face, downsizing of the first spraying mechanism can be realized. The downsizing realizes easy installation/removal.

With such a structure that the spray guide has the expanded parts, the prepreg sheet end edge is easily inserted into a space formed by the spray guide.

In a peeling method of the present invention capable of solving the above described technical problems, the protective sheets attached to the prepreg sheet are peeled therefrom. The peeling method using a protective sheet automatic peeling apparatus includes a process of positioning an end edge of a prepreg sheet with protective sheets attached thereto at a peeling start position, a process of spraying the first air from the front along a prepreg sheet end face, a process of spraying the second air onto peeling boundaries of the protective sheets, a process of spraying the third air onto the protective sheets peeled off by the second air, a process of gripping the protective sheets oriented by the third air, a process of, while delivering the prepreg sheet in a feeding direction and further delivering the gripped protective sheets in a direction opposite to the feeding direction, spraying the fourth air onto the peeling boundaries of the protective sheets, and a process of extracting the prepreg sheet delivered in the feeding direction after the protective sheets are peeled therefrom.

The above described processes can realize the automatization of the peeling apparatus.

Advantageous Effect of Invention

The peeling apparatus of the present invention can realize automatization of a protective sheet peeling operation.

BRIEF DESCRIPTION OF DRAWINGS

FIG. 6 illustrates operations of the peeling apparatus (second air spraying).

FIG. 10 illustrates operations of the peeling apparatus (extracting)

DESCRIPTION OF EMBODIMENTS

~Entire Structure and Structure of Peeling Apparatus~

Figure 1:
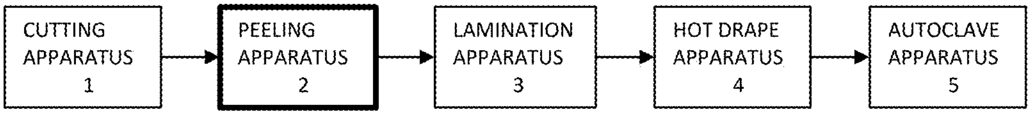
FIG. 1 schematically illustrates FRP forming system including a peeling apparatus according to the present invention.

FIG. 1 schematically illustrates the entire system of FRP forming system. The entire system includes a cutting apparatus 1, a peeling apparatus 2, a lamination apparatus 3, a hot drape apparatus 4, and an autoclave apparatus 5.

A prepreg sheet is formed in such a manner that a reinforcing material such as a carbon fiber is impregnated with an uncured resin to be formed into a sheet shape. The cutting apparatus 1 cuts the prepreg sheet into a desired size and shape.

The uncured prepreg sheet has viscosity. Therefore, the prepreg sheet is provided with protective sheets on its both surfaces. The peeling apparatus 2 peels the protective sheets off from the prepreg sheet after cutting. The present invention is directed to the peeling apparatus 2 which will be described below in detail.

The prepreg sheets from which the protective sheets are peeled off are delivered one by one to the lamination apparatus 3. The automated lamination apparatus 3 laminates the prepreg sheets one by one on a placing table, resulting in forming a laminated body.

The laminated body is delivered to the hot drape apparatus 4. The hot drape apparatus 4 shapes the laminated body into a shape conforming to the shape of a mold.

The laminated body after shaping is subjected to bagging together with the mold to be delivered to the autoclave apparatus 5. The autoclave apparatus 5 applies heat and pressure to the bagged laminated body. Accordingly, cured FRP parts are manufactured.

Automatization of the cutting apparatus 1, the peeling apparatus 2, the lamination apparatus 3, the hot drape apparatus 4, and the autoclave apparatus 5 can realize automatization of the entire system.

Now, a structure of the peeling apparatus 2 will be described below. Numbers of each structure are to be referred to the operations illustrated in FIG. 3 to FIG. 10.

The peeling apparatus 2 includes a loading unit 11, a prepreg sheet conveying unit 12, a leading end position detection unit 13, an air spraying unit 14, 15, a peeling state detection unit 16, a protective sheet gripping/conveying unit 17, 18, an extraction unit 19, and a control unit 20.

The loading unit 11 is supplied with the prepreg sheet with the protective sheets attached thereto after cutting.

The prepreg sheet conveying unit 12 delivers, in a feeding direction, the prepreg sheet supplied to the loading unit 11. A plurality of rollers provided along a conveyance path is rotatably driven. As a result, the prepreg sheet is gripped by the driving rollers and free rollers rotatably driven according to the conveyance of the prepreg sheet which is conveyed from somewhere in the conveyance path.

The leading end position detection unit 13 is provided near the end edge of the prepreg sheet conveying unit 12. When the prepreg sheet with the protective sheets attached thereto is conveyed, the leading end position detection unit 13 detects whether a leading end position of the prepreg sheet arrives at a predetermined position.

The leading end position detection unit 13 is a sensor. Any sort of sensor, e.g., camera, can be employed. The leading end position detection unit 13 analyzes images captured by the camera to detect the leading end position of the prepreg sheet. For example, the leading end position detection unit 13 executes binarization processing to the images to thereby determine a ratio.

The air spraying unit 14, 15 sprays air onto the prepreg sheet or/and the protective sheets. The air spraying unit includes the first spraying mechanism 14 and the second spraying mechanism 15.

The first spraying mechanism 14 is provided in front of the prepreg sheet end face at a peeling start position in a freely installable/removable manner and sprays the first air from the front along the prepreg sheet end face.

The second spraying mechanism 15 sprays the second air to the fourth air in a freely changeable manner between in a direction onto the prepreg sheet and in a direction away from the prepreg sheet.

The peeling state detection unit 16 detects a peeling state of the protective sheets via the air sprayed by the air spraying unit 14, 15. The peeling state detection unit 16 is a sensor. Any sort of sensor can be employed. For example, the camera of the leading end position detection unit 13 may be shared.

The protective sheet gripping/conveying unit 17, 18 grips the protective sheets which are peeled off via the air sprayed by the air spraying unit and delivers the protective sheets in a direction opposite to the feeding direction of the prepreg sheet as well.

The protective sheet gripping/conveying unit includes belt conveyors 17 and auxiliary rollers 18. The belt conveyors 17 deliver the protective sheets diagonally backward to the feeding direction of the prepreg sheet. The auxiliary rollers 18 are provided in a movable manner and grip the protective sheets upon driving of the belt conveyors 17.

The extraction unit 19 extracts the prepreg sheet delivered in the feeding direction after the protective sheets are peeled therefrom. The extraction unit 19 includes driving rollers which are provided along the conveyance path in a rotatably driving manner and free rollers driven according to the conveyance of the prepreg sheet. The prepreg sheet is held between the driving rollers and the free rollers. The rollers are provided with coating for preventing the prepreg sheet, after the protective sheets are peeled therefrom, from sticking to the rollers.

The control device 20 controls the loading unit 11, the prepreg sheet conveying unit 12, the leading end position detection unit 13, the air spraying unit 14, 15, the peeling state detection unit 16, the protective sheet gripping/conveying unit 17, 18, and the extraction unit 19.

Now, a structure of the control device 20 will be described below. Numbers of each structure is to be referred to the operations illustrated in FIG. 3 to FIG. 10.

The control device 20 includes a prepreg sheet conveying unit-control function 22, a prepreg sheet position detection function 23, a first spraying mechanism-control function 24, a second spraying mechanism-control function 25, a protective sheet peeling state detection function 26, a protective sheet gripping/conveying unit-control function 27, and an extraction unit-control function 29. The control device 20 is an information processor constituted of a CPU and a memory. The control device 20 executes each processing of a program.

Detailed descriptions of functions 22 to 29 will be described in detail one by one in the next Operation and Control section.

~Operation and Control~

Figure 2:
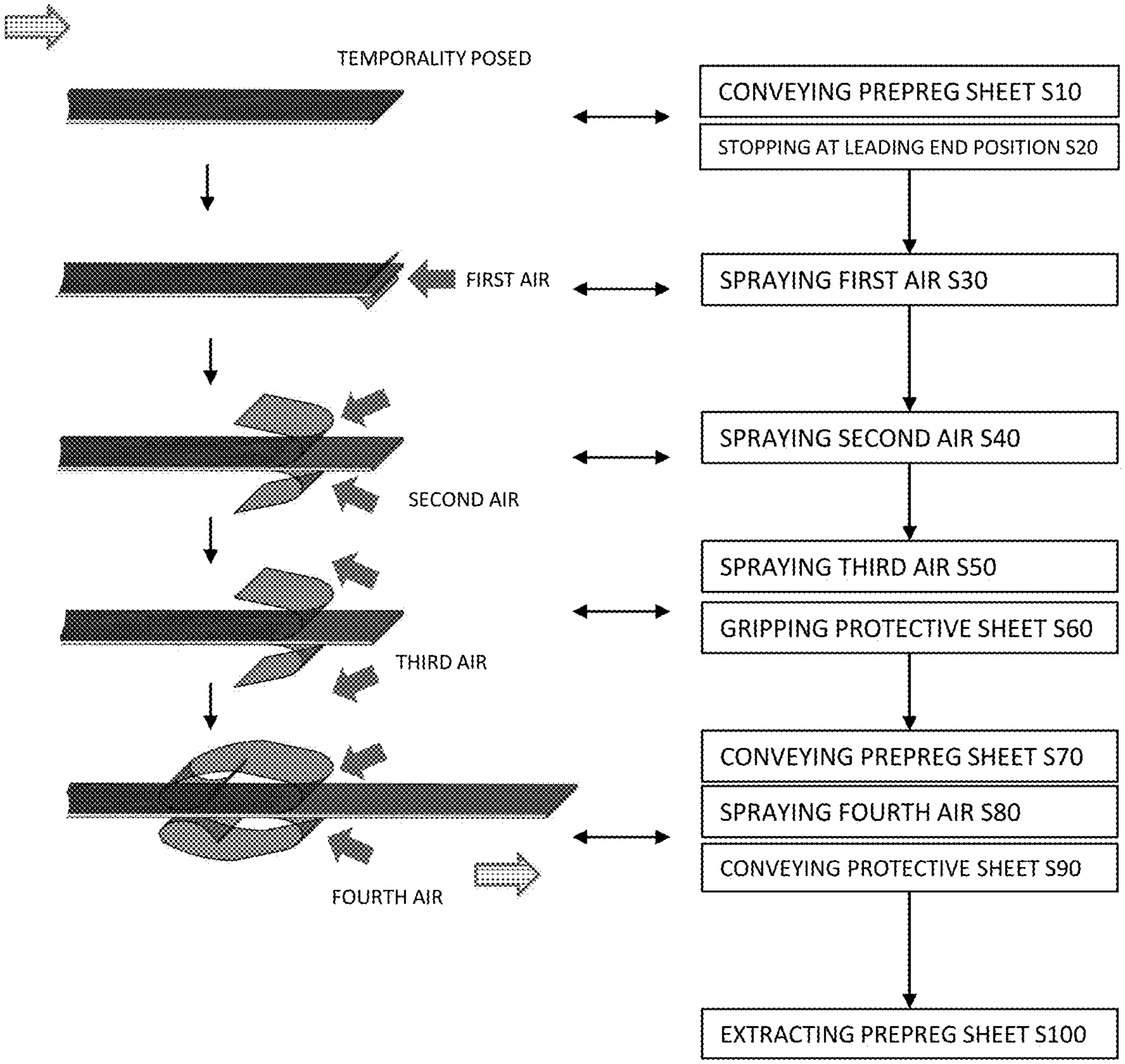
FIG. 2 schematically illustrates operations and the corresponding control flow of the peeling apparatus.

FIG. 2 shows a schematic diagram illustrating operations of the peeling apparatus and a control flow diagram of the peeling apparatus, which are illustrated in a corresponding manner. FIG. 2 shows air spraying operations which are material to the peeling apparatus and each corresponding control processing.

FIG. 3 to FIG. 10 illustrate the respective operations. Each operation will be described and control processing corresponding thereto will also be described.

Figure 3:
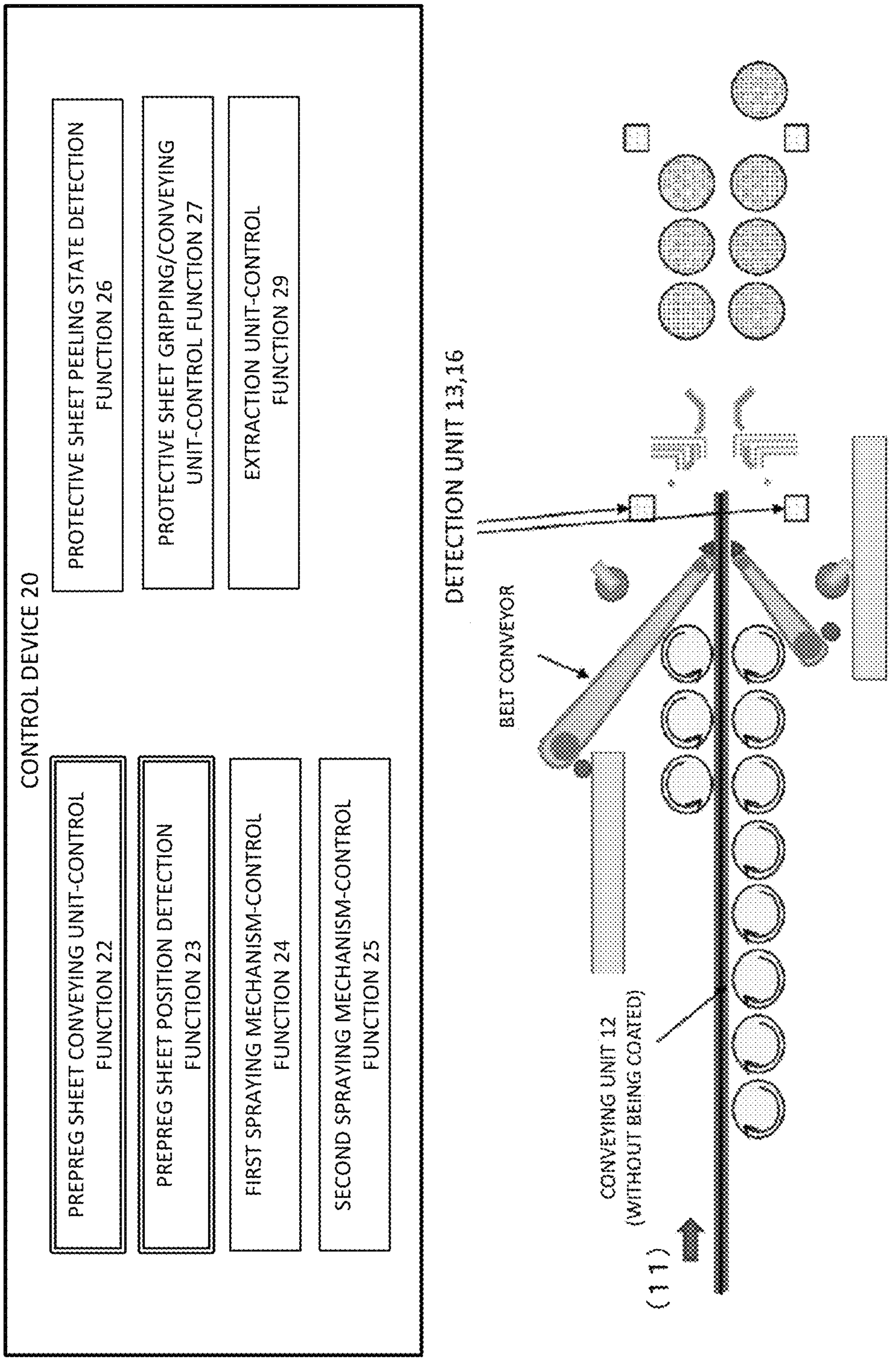
FIG. 3 illustrates operations of the peeling apparatus (temporarily posed)

FIG. 3 illustrates an operation as to the conveyance of prepreg sheet and an operation as to a temporal stop thereof.

The prepreg sheet conveying unit-control function 22, when the prepreg sheet with the protective sheets attached thereto is placed on the loading unit 11, drives the prepreg sheet conveying unit 12 (S10). As a result, the prepreg sheet is delivered in the feeding direction in a manner as illustrated.

The prepreg sheet position detection function 23 inputs information from the leading end position detection unit 13 as to whether the leading end position of the prepreg sheet arrives at the predetermined position. Upon detection of the leading end position of the prepreg sheet, the prepreg sheet conveying unit-control function 22 causes the prepreg sheet conveying unit 12 to stop driving (S20). As a result, the prepreg sheet stops at the predetermined position.

Figure 4:
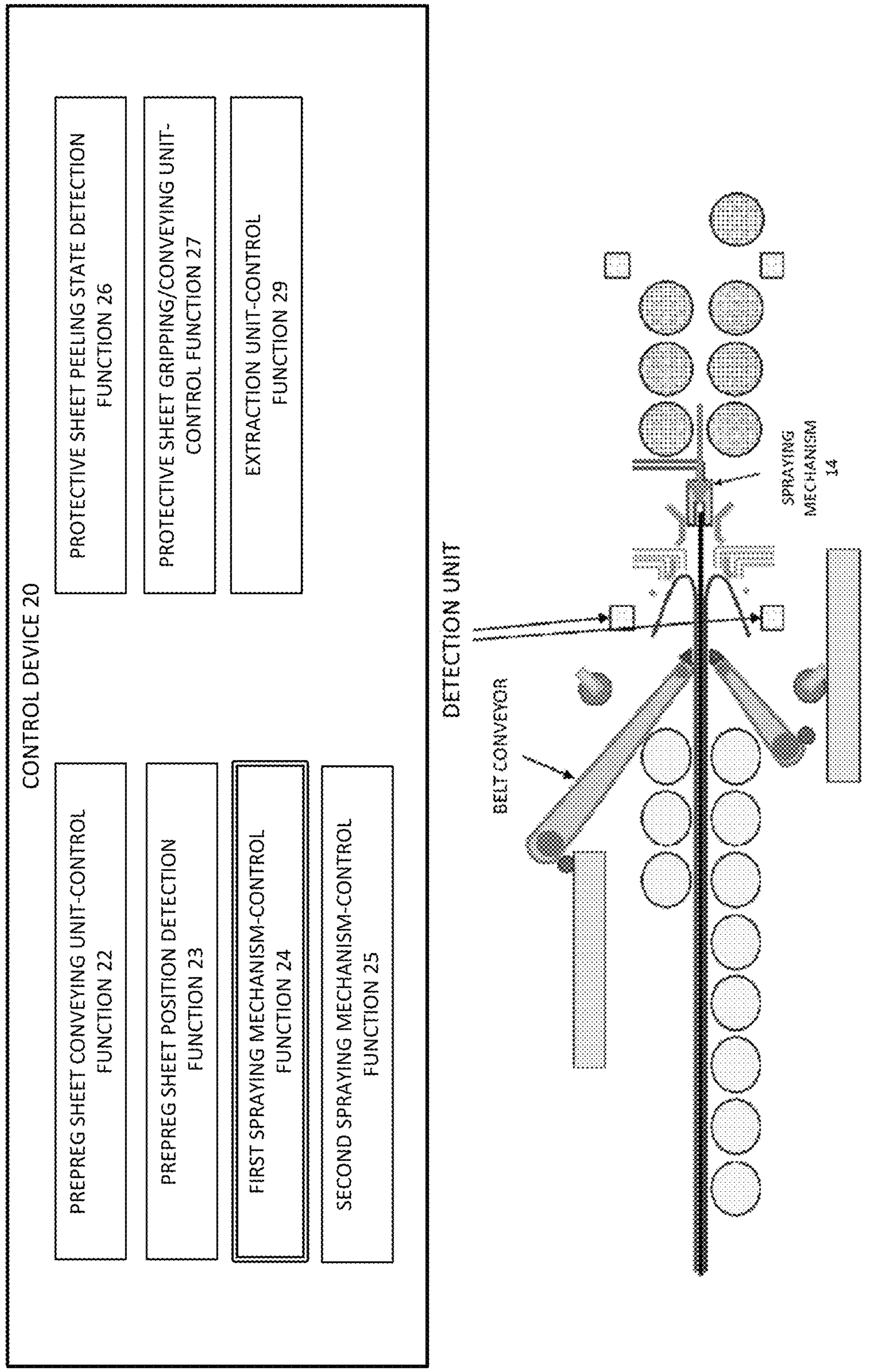
FIG. 4 illustrates operations of the peeling apparatus (first air spraying).
Figure 5:
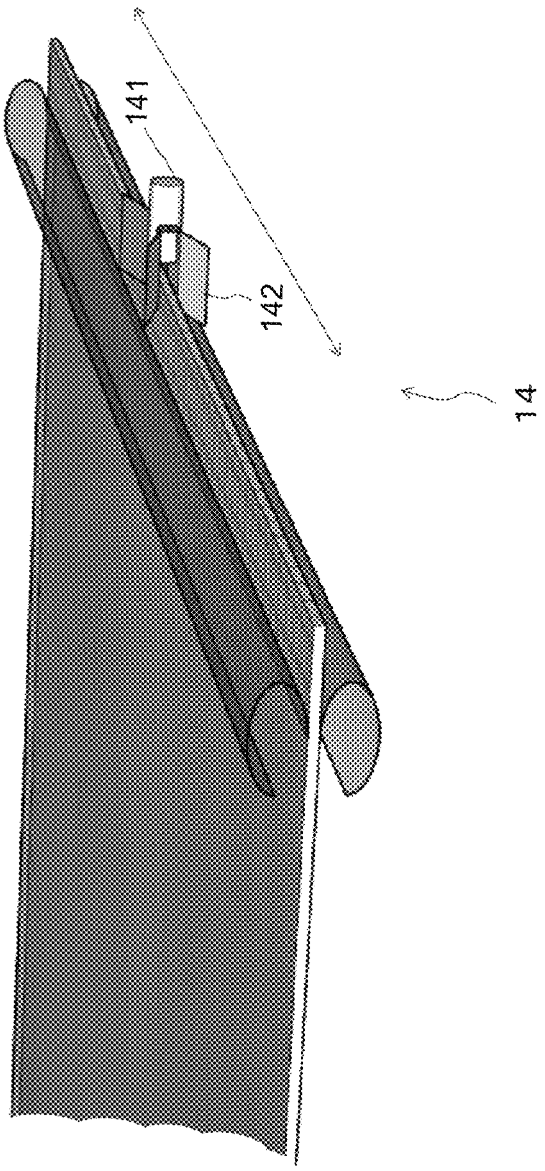
FIG. 5 schematically illustrates the first air spraying.

FIG. 4 illustrates an operation as to the first air spraying. FIG. 5 illustrates a detailed operation as to the first air spraying.

When the leading end position of the prepreg sheet stops at the predetermined position, the first spraying mechanism-control function 24 disposes the first spraying mechanism 14 in front of the prepreg sheet end face. Further, the first spraying mechanism-control function 24 causes the first spraying mechanism 14 to move along the prepreg sheet end face and to spray the first air onto the front of the end face as well (S30). The first air starts peeling of the protective sheets from the end edge of the prepreg sheet.

The protective sheet peeling state detection function 26 inputs information from the peeling state detection unit 16 as to the protective sheet peeling state. Upon determination of start peeling of the protective sheets (peeling of the first area), the first spraying mechanism-control function 24 stops driving of the first spraying mechanism 14.

Figure 7:
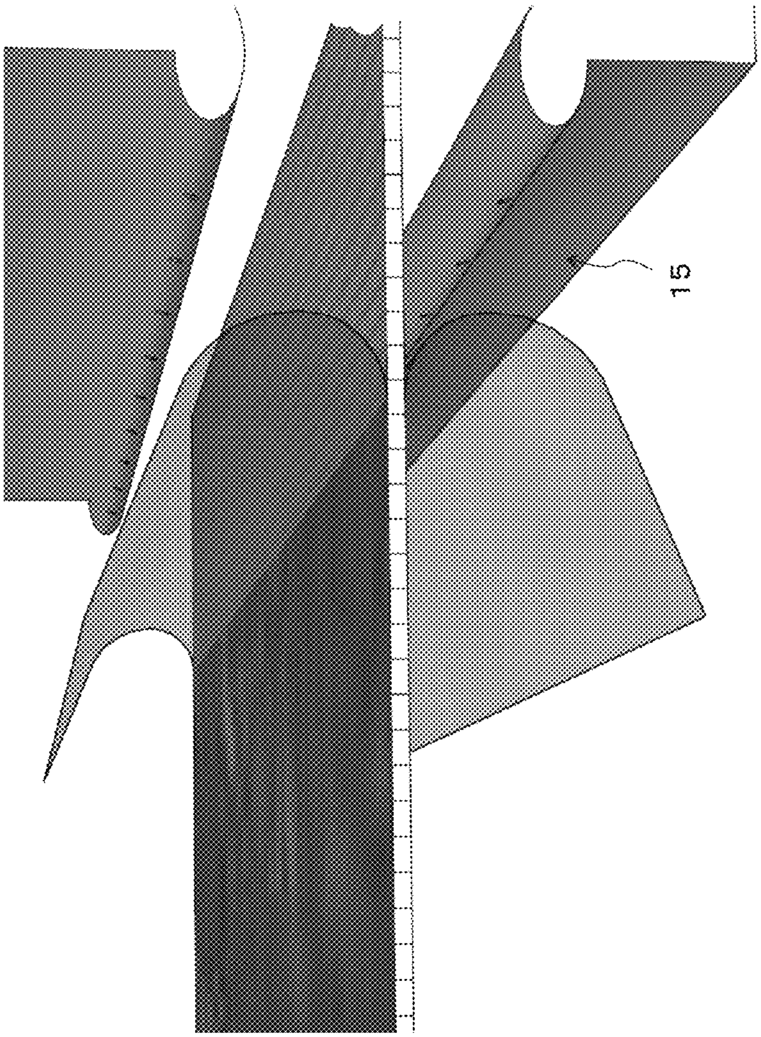
FIG. 7 schematically illustrates the second air spraying.

FIG. 6 illustrates an operation as to the second air spraying. FIG. 7 illustrates a detailed operation as to the second air spraying.

Further, the second spraying mechanism-control function 25 causes the second spraying mechanism 15 to spray the second air onto the peeling boundaries of the protective sheets, i.e., in a direction onto the prepreg sheet (S40). The second air expands the peeled area.

Figure 8:
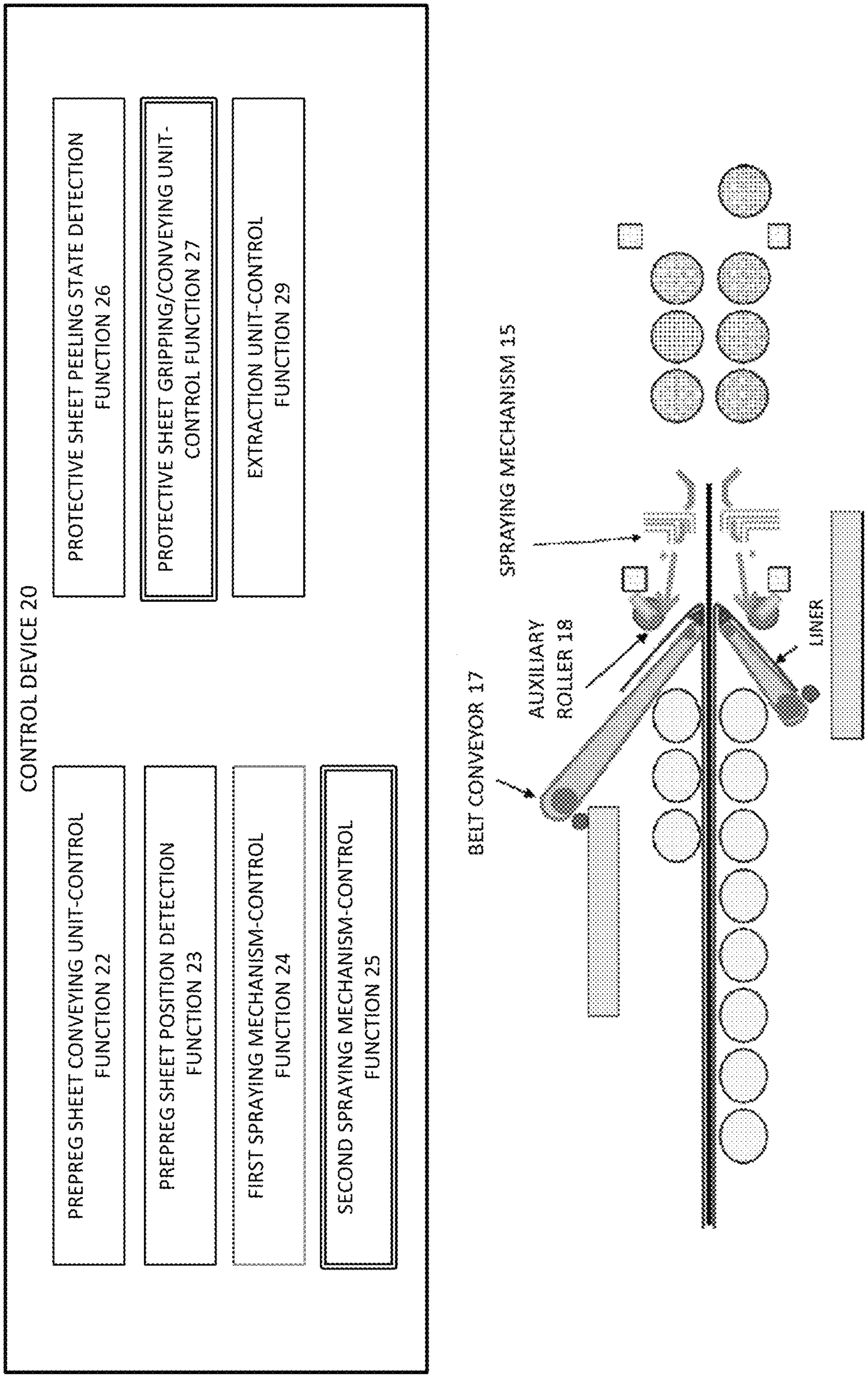
FIG. 8 illustrates operations of the peeling apparatus (third air spraying and protective sheet gripping).

FIG. 8 illustrates an operation as to the third air spraying and an operation relating thereto.

The protective sheet peeling state detection function 26 inputs information from the peeling state detection unit 16 as to the protective sheet peeling state. Upon determination of peeling of the protective sheets for a predetermined area (second area), the second spraying mechanism-control function 25 changes the spraying direction of the second spraying mechanism 15 and causes the second spraying mechanism 15 to spray the third air onto the protective sheets peeled off by the second air, i.e., in a direction away from the prepreg sheet (S50). The third air urges the peeled protective sheets toward the backward of the prepreg sheet feeding direction.

The protective sheet gripping/conveying unit-control function 27 causes the auxiliary rollers 18, in conjunction with the third air spraying, to move to a gripping position and causes the belt conveyors 17 to drive as well (S60). As a result, the peeled protective sheets are gripped and started to be conveyed in a direction opposite to the feeding direction of the prepreg sheet.

Here, the protective sheet peeling state detection function 26 inputs information from the peeling state detection unit 16 as to the protective sheet peeling state and confirms expansion of the peeled area. Until obtaining the desired peeled area, the above described controls are repeated (S20→S30→S20→S30→).

Further, in the above exemplified controls, the protective sheet peeling state detection function 26 always monitors the peeling state to determine, based on the protective sheet peeling state, a switching timing from the first air to the second air and a switching timing from the second air to the third air. Alternatively, it is also possible to allow the protective sheet peeling state detection function 26, by setting predetermined operations of the first spraying mechanism 14 and the second spraying mechanism 15, to confirm the expansion of the desired peeled area.

Further, in the above exemplified controls, there is no description about a control of confirming whether the protective sheet gripping/conveying unit 17, 18 appropriately grips the protective sheets. Alternatively, it is also possible to execute the control by the protective sheet gripping/conveying unit-control function 27 after the gripping state is confirmed by a separate sensor.

Figure 9:
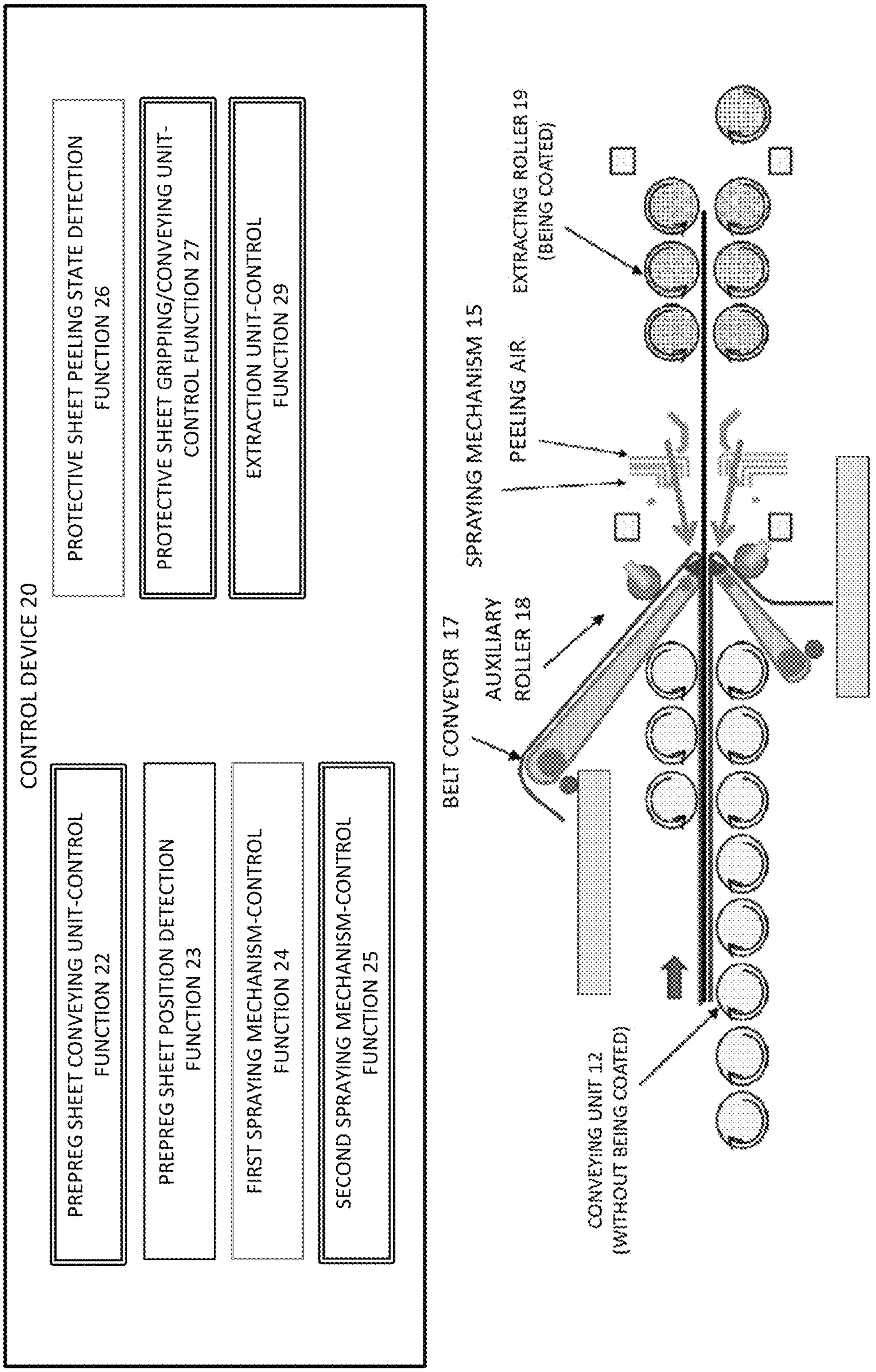
FIG. 9 illustrates operations of the peeling apparatus (fourth air spraying).

FIG. 9 illustrates an operation as to the fourth air spraying and an operation related thereto.

At any timing before the below mentioned control, the first spraying mechanism-control function 24 removes the first spraying mechanism 14 from the front of the prepreg sheet end face. As a result, conveyance of the prepreg sheet can be restarted.

In conjunction with the conveyance of the protective sheets, the prepreg sheet conveying unit-control function 22 causes the prepreg sheet conveying unit 12 to restart driving (S70).

Further, the second spraying mechanism-control function 25 changes the spraying direction of the second spraying mechanism 15 and causes the second spraying mechanism 15 to spray the fourth air onto the peeling boundaries of the protective sheets, i.e., in a direction onto the prepreg sheet (S80). The fourth air is substantially the same as the second air.

The protective sheet gripping/conveying unit-control function 27 causes the belt conveyors 17 to continue their driving (S90).

As a result of the plurality of controls, the protective sheets are peeled off in conjunction with the conveyance of the prepreg sheet.

When the prepreg sheet is conveyed for a predetermined length, the extraction unit-control function 29 causes the extraction unit 19 to drive (S100). As a result, the prepreg sheet is gradually delivered from the prepreg sheet conveying unit 12 to the extraction unit 19.

FIG. 10 illustrates an operation as to extraction of the prepreg sheet.

The prepreg sheet position detection function 23 may input information from the leading end position detection unit 13 as to whether a trailing end position of the prepreg sheet arrives at a predetermined position. The prepreg sheet position detection function 23 may detects the trailing end position of the prepreg sheet by another method. For example, the prepreg sheet position detection function 23 may determine that the trailing end position of the prepreg sheet arrives at the predetermined position when the prepreg sheet is conveyed for a predetermined length.

When the trailing end position of the prepreg sheet is detected, the prepreg sheet conveying unit-control function 22 causes the prepreg sheet conveying unit 12 to stop driving. The second spraying mechanism-control function 25 stops driving of the second spraying mechanism 15. The protective sheet gripping/conveying unit-control function 27 stops driving of the belt conveyors 17 and retrieves the auxiliary rollers 18 to a gripping releasing position.

The extraction unit-control function 29 continues driving of the extraction unit 19 (S100). As a result, the protective sheets are peeled off from the prepreg sheet, and the prepreg sheet is delivered to the lamination apparatus 3 where the next processing will be performed.

On the other hand, the prepreg sheet conveying unit-control function 22 waits for the next prepreg sheet until it is supplied.

The control device 20 repeats the above described control processing when the next prepreg sheet is placed on the loading unit 11.

~Effect~

The above described controls and the operations can realize automatization of the peeling apparatus 2.

As a result, a manual operation can be eliminated which contributes to decreasing of a manufacturing cost, a high quality (without occurrence of wrinkles and distortions) can be kept, and the peeling operation and the subsequent conveyance operation directed toward the lamination apparatus 3 can be performed in series. This realizes shortened working hours.

Automatization of the peeling apparatus 2 can realize the automatization of the entire FRP forming system.

~Details of Air Spraying Unit~

The air spraying unit includes the first spraying mechanism 14 and the second spraying mechanism 15.

The first spraying mechanism 14 sprays the first air onto the front of the prepreg sheet end face. The first air starts peeling of the protective sheets.

The second spraying mechanism 15 can freely change the spraying direction between a direction onto the prepreg sheet and a direction away from the prepreg sheet. In other words, the second spraying mechanism 15 sprays the second air and the fourth air onto the peeling boundaries of the protective sheets and sprays the third air onto the peeled protective sheets as well. The second air and the fourth air serve to continue the peeling of the protective sheets. The third air orients the protective sheets after they are peeled off.

More specifically, in the present embodiment, appropriate control of the first air to the fourth air can realize automatization of the peeling operation of the protective sheets.

The first spraying mechanism 14 is provided in front of the prepreg sheet end face at the peeling start position in a freely installable/removable manner. This makes it possible to spray the first air onto the front of the prepreg sheet end face without hindering the conveyance/extraction of the prepreg sheet.

In the first spraying mechanism 14, a small spray nozzle 141 moves along the prepreg sheet end face (see, FIG. 5). Because of its small size, the spray nozzle 141 can be installed/removed with ease.

Figure 11:
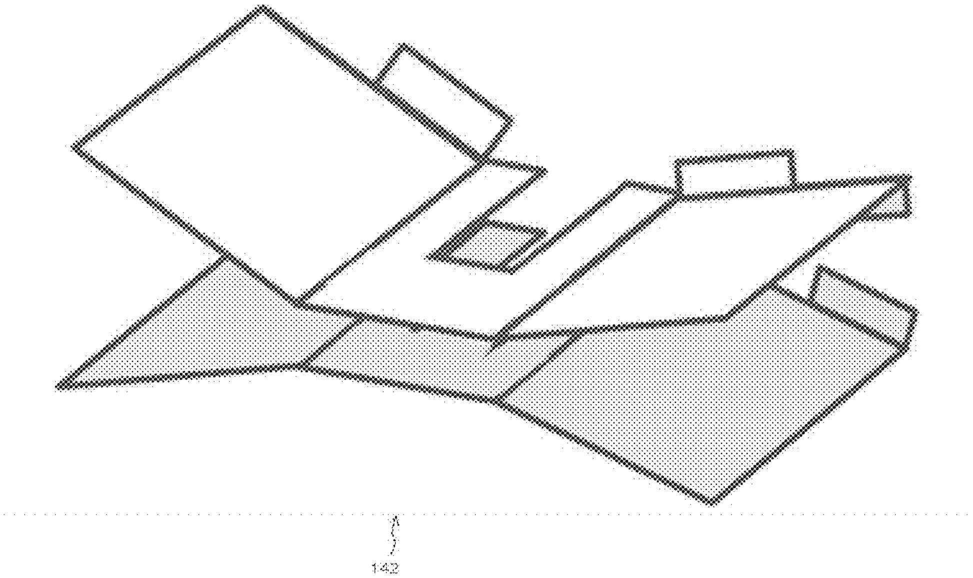
FIG. 11 illustrates an example of a spray guide.

The first spraying mechanism 14 further includes a spray guide 142 provided on the spray nozzle (see, FIG. 5). FIG. 11 shows an example of the spray guide.

The spray guide 142 is provided in such a manner that the prepreg sheet end edge at the peeling start position is sandwiched from the both sides.

With the above described structure, fluttering of the prepreg sheet end edge when the first air is sprayed onto the front of the prepreg sheet end face can be suppressed. As a result, appropriate peeling of the protective sheets is started.

The spray guide 142 includes two central plate parts facing to each other, connection parts for connecting the two central plate parts, opening parts for receiving the spray nozzle 141 therein, and right and left expanded parts having an expanded holding width compared with a distance between the central plate parts facing to each other.

The first spraying mechanism 14 is installed/removed as required. The expanded parts of the spray guide 142 make it easy to insert the prepreg sheet end edge into the space formed by the spray guide 142. With this structure, the distance between the central plate parts facing to each other can be made narrow. This contributes to securing of the fluttering suppression effect.

Because the second spraying mechanism 15 does not hinder the conveyance/extraction of the prepreg sheet, it is permanently fixed at an upper position and a lower position of the prepreg sheet (see, FIG. 7). The second spraying mechanism 15 has a plurality of spraying holes in a width direction and is controlled to spray air sequentially in the width direction from the plurality of spraying holes.

In stead of the above structure, the second spraying mechanism 15 also may have a small nozzle that is provided in a freely installable/removable manner and movable in the width direction as well as the case of the first spraying mechanism 14.

Figure 12:
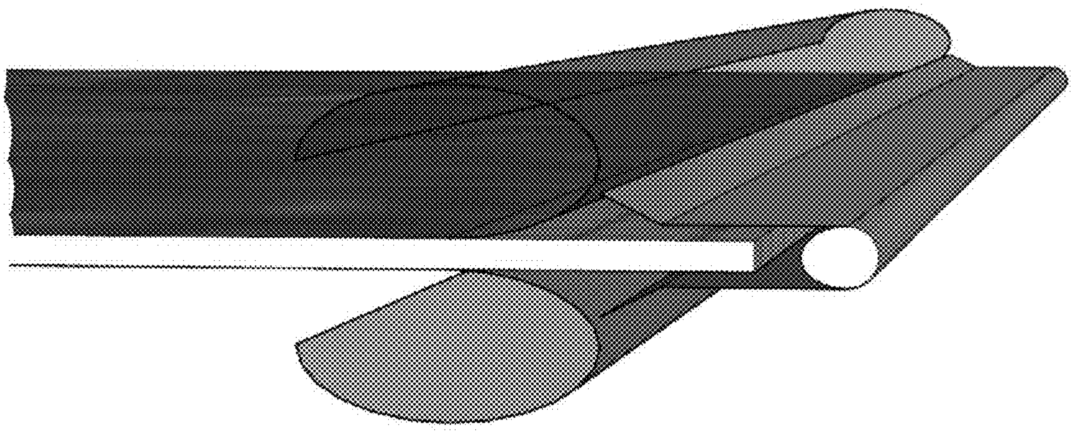
FIG. 12 is Modification Example of a spraying mechanism.

FIG. 12 illustrates Modification Example of the first spraying mechanism 14. Where the first spraying mechanism 14 according to the present Embodiment as illustrated in FIG. 5 and FIG. 11 has a small nozzle movable in the width direction, Modification Example may have a nozzle of a shape continuously extending in the width direction as far as it is provided in a freely installable/removable manner. The spray nozzle has a plurality of spraying holes in the width direction and is controlled to sequentially spray the air in the width direction from the plurality of spraying holes. With the structure, peeling of the protective sheets is appropriately started as well as the case of the first spraying mechanism 14 according to the present Embodiment.

A spray guide according to Modification Example has a right expanded part and a left expanded part of which holding widths expand toward the first air spraying direction.

REFERENCE CHARACTER LIST

1 cutting apparatus
2 peeling apparatus
3 lamination apparatus
4 hot drape apparatus
5 autoclave apparatus
11 loading unit
12 prepreg sheet conveying unit
13 prepreg sheet position detection unit
14 first spraying mechanism
15 second spraying mechanism
16 protective sheet peeling state detection function
17 belt conveyor (protective sheet gripping/conveying unit)
18 auxiliary roller (protective sheet gripping/conveying unit)
19 extraction unit
20 control unit
22 prepreg sheet conveying unit-control function
23 prepreg sheet position detection function
24 first spraying mechanism-control function
25 second spraying mechanism-control function
26 protective sheet peeling state detection function
27 protective sheet gripping/conveying unit-control function
29 extraction unit-control function

The invention claimed is:

1. A protective sheet automatic peeling method using a protective sheet automatic peeling apparatus, the method comprising:

a process of positioning an end edge of a prepreg sheet at a peeling start position, the prepreg sheet being provided with protective sheets attached thereto;

a process of spraying a first air from a front along a prepreg sheet end face;

a process of spraying a second air onto peeling boundaries of the protective sheets to peel the sheets;

a process of spraying a third air onto the protective sheets peeled by the second air to orient the sheets;

a process of gripping the protective sheets oriented by the third air;

a process of spraying a fourth air onto the peeling boundaries of the protective sheets while delivering the prepreg sheet in a feeding direction and delivering the gripped protective sheets in a direction opposite to the feeding direction; and a process of extracting the prepreg sheet delivered in the feeding direction after the protective sheets are peeled therefrom.

* * * * *